United States Patent [19]
Jachow et al.

[11] Patent Number: 5,378,383
[45] Date of Patent: Jan. 3, 1995

[54] PROCESS FOR PREPARING MODIFIED CHROMIUM DIOXIDE

[75] Inventors: Harald Jachow, Worms; Ekkehard Schwab, Neustadt; Reinhard Koerner, Frankenthal; Norbert Mueller, Friedelsheim; Rudi Lehnert, Ludwigshafen; Manfred Ohlinger, Frankenthal; Helmut Auweter, Limburgerhof; Helmut Jakusch, Frankenthal; Ronald J. Veitch, Maxdorf; Michael Bobrich, Boehl-Iggelheim, all of Germany

[73] Assignee: BASF Magnetics GmbH, Mannheim, Germany

[21] Appl. No.: 109,425

[22] Filed: Aug. 20, 1993

Related U.S. Application Data

[62] Division of Ser. No. 992,927, Dec. 18, 1992, abandoned.

[30] Foreign Application Priority Data

Dec. 20, 1991 [DE] Germany ............... 4142166

[51] Int. Cl.$^6$ ............................................. C01G 37/027
[52] U.S. Cl. .............................. 252/62.56; 252/62.51; 423/607
[58] Field of Search ................... 252/62.51, 62.56; 423/607

[56] References Cited

U.S. PATENT DOCUMENTS

| | | | |
|---|---|---|---|
| 4,698,220 | 10/1987 | Crandall et al. | 252/62.51 |
| 5,030,371 | 7/1991 | Mueller et al. | 252/62.51 |

*Primary Examiner*—Jack Cooper
*Attorney, Agent, or Firm*—Keil & Weinkauf

[57] ABSTRACT

A magnetic recording medium comprising a nonmagnetic substrate and at least one magnetic layer applied thereon and containing an acicular chromium dioxide uniformly distributed in a polymeric binder and additives and having a coercive force of at least 60 kA/m, a mean particle length of the chromium dioxide of less than 300 nm, whose factor HD according to the formula $$HD = \frac{KT \cdot L}{100 \cdot \Delta L}$$

where KT is the coercive force of the magnetic layer in [kA/m], measured in an external field of 380 kA/m, L is the mean particle length and $\Delta L$ is the range of the particle size distribution, determined from the numerical distribution of the particle length, both measured in [nm], is greater than 1.85, and a process for the preparation of this chromium dioxide.

1 Claim, No Drawings

PROCESS FOR PREPARING MODIFIED CHROMIUM DIOXIDE

This is a division of application Ser. No. 07/992,927, filed Dec. 18, 1992, now abandoned.

The present invention relates to a magnetic recording medium comprising a nonmagnetic substrate and at least one magnetic layer applied thereon and containing an acicular chromium dioxide uniformly distributed in a polymeric binder and additives and having a coercive force of at least 60 kA/m, a small particle size and a narrow particle size distribution, and to a process for the preparation of this chromium dioxide.

Acicular chromium dioxide, its preparation and the use of this material for magnetic recording media have been described in many publications. Compared with recording media based on other magnetic oxides, magnetic recording media which contain chromium dioxide generally have superior magnetic properties which are attributable to the high values of the coercive force, the specific remanance and the saturation magnetization and in particular to the uniform shape and the small dimensions of the acicular chromium dioxide particles.

The continuing development in the processing of analog and in particular digital audio and video signals also gives rise to the need for appropriately adapted magnetic recording media for the storage of such signals. An essential feature must be an increase in the storage density. In the case of magnetic recording media which contain magnetizable particles, such as chromium dioxide, in the binder matrix of the magnetic layer, this means that, in addition to the reduction in the layer thickness, an increase in the coercive force of the magnetic particles and a reduction in the magnetic particle size are necessary. However, with a smaller thickness of the magnetic layer, the magnetic moment of the particles must be increased to the same extent in order to maintain the residual flux of the magnetic layer unit which is decisive for the recording level.

There has therefore been no lack of attempts to continue the development of chromium dioxide materials in order to achieve higher coercive force, higher saturation magnetization and at the same time a narrower particle size distribution. Chromium dioxide is usually obtained by two processes. In addition to the synthesis of the chromium dioxide by synproportionation of the chromium(III) and chromium(VI) oxides under hydrothermal conditions, as described in, for example, EP-A 27 640, the preparation by thermal decomposition of hydrated chromium(III) chromate is also known. For example, DE-A 22 10 059 describes a process in which $Cr_2(CrO_4)_3 \cdot nH_2O$, where n is from 1 to 8, is decomposed at from 250 to 500° C. and under from 30 to 1000 bar. The resulting product has a coercive force which is too low for the recording media now conventionally used and which, in the case of the higher values of n, decreases even further. Where the values for n are greater than 8, the residual induction and the saturation magnetization also decrease as a result of the CrOOH simultaneously formed. An improvement in the magnetic properties can be achieved using a process according to DE-A 23 32 854, in which a substance which undergoes exothermic decomposition under the stated reaction conditions is mixed with the chromium(III) chromate. According to DE-A 29 19 572, modification of the chromium dioxide with lanthanum, yttrium, barium or strontium is also supposed to increase the magnetic characteristics. Furthermore, modified chromium dioxide can also be prepared from chromium(III) chromates having a higher water content (degree of hydration n of from 8 to 12) (DE-B 25 20 030 and DE-B 26 48 305).

The common feature for the processes for the preparation of chromium dioxide from chromium(III) chromate is the use of a very small amount of water in order to avoid a loss of saturation magnetization by formation of CrOOH. Furthermore, the preparation of the chromium(III) chromates used in these processes is a very time-consuming multistage process and hence uneconomical. In addition, the chromium(III) chromates are obtained with a low degree of hydration and in powder form, necessitating expensive safety means, such as filters and encapsulated apparatuses. In the case of higher degrees of hydration, highly viscous pastes which are difficult to handle, i.e. not free-flow, are obtained. A further development of the preparation of chromium dioxide from chromium(III) chromate is described in EP-A 0 304 851 and U.S. Pat. No. 5,030,371. Thus, $Cr_2(CrO_4)_3 \cdot nH_2O$ where n is $\geq 13$ is prepared in a substantially shorter time and with a substantially cheaper apparatus by reducing an aqueous $CrO_3$ suspension with organic compounds, for example glycerol, methanol or glycol, the potential water content of the reducing agent being taken into account, and at from 200° to 500° C. under from 50 to 700 bar to give chromium dioxide. The product obtained according to U.S. Pat. No. 5,030,371, a $CrO_2$ modified with iron and tellurium or antimony, has a high specific saturation magnetization and a coercive force of more than 60 kA/m but, owing to process engineering problems, considerable foaming during the addition of the glycerol and the very high viscosity of the chromium(III) chromate material, is very difficult to obtain in relatively large amounts with uniform properties. Overcoming the disadvantage of the high viscosity by using organic reducing agents which react only partially with $CrO_3$ during the preparation of the reaction mixture is described in EP-A 239 089. Part of the exothermic reduction of $CrO_3$ then takes place during the reaction in the reactor, a considerable part of the required heat energy being supplied by the chemical system itself (heat kick) and uniform heat distribution of the reaction mixture being possible. However, this has the disadvantage that the particle size distribution of the resulting material is adversely affected during nucleation, owing to the fact that the temperature is uncontrollable. Another disadvantage is that the resulting magnetic powders have coercive forces of less than 53 kA/m.

These chromium dioxide materials obtainable according to the prior art are suitable for the preparation of high quality magnetic recording media suitable for the present conventional applications, but they have weaknesses with regard to the future high density recording and storage methods. Magnetic recording media which are capable of meeting these requirements too must have not only a constantly high residual flux of the magnetic layer but also a high coercive force of the layer of more than 60 kA/m and a narrow particle size distribution of the acicular magnetic materials incorporated in the layer in conjunction with a small mean particle length required for the desired high information density per storage area.

It is an object of the present invention to provide magnetic recording media which contain chromium dioxide as magnetizable material in the recording layer and which meet the stated requirements with respect to suitability for use for the high density storage of information.

We have found that this object is achieved by magnetic recording media comprising a nonmagnetic substrate and at least one magnetic layer applied thereon and containing an acicular chromium dioxide uniformly distributed in a polymeric binder and additives and having a coercive force of at least 60 kA/m, wherein the mean particle length of the chromium dioxide is less than 300 nm and the factor HD according to the formula $$HD = \frac{KT \cdot L}{100 \cdot \Delta L}$$

where KT is the coercive force of the magnetic layer in [kA/m], measured in an external field of 380 kA/m, L is the mean particle length and $\Delta L$ is the range of the particle size distribution, determined from the numerical distribution of the particle length, both measured in [nm], is greater than 1.85, preferably from 1.85 to 4.0.

The present invention furthermore relates to a process for the preparation of a chromium dioxide which is suitable for the novel magnetic recording media, is modified with iron and tellurium and/or antimony and has a coercive force greater than 60 kA/m, a saturation magnetization greater than 85 $nTm^3/g$ and a narrow particle size distribution in conjunction with a mean particle length of less than 300 nm, by reacting an aqueous $CrO_3$ suspension, to which from 0.05 to 10% by weight, based on chromium dioxide, of iron oxide and tellurium oxide and/or an antimony compound have been added, and organic reducing agents for establishing a Cr(VI):Cr(III) ratio of from 4:2 to 1:1, from 1.54 to 2.32 parts by weight of $CrO_3$ being used per part of water, taking into account the amount of water formed during the oxidation of the organic reducing agents, at from 250° to 400° C. under at least 70 bar, wherein the organic reducing agents used are glycerol and octanol, the amount of glycerol being from 25 to 70% based on the total reduction equivalent.

The reduction equivalent is defined as the amount of reducing agent required for establishing the Cr(III)/Cr(VI) ratio by proportionate reduction of $CrO_3$. The reducing agents glycerol and octanol are oxidized in the course of the $CrO_2$ synthesis essentially to $CO_2$ and water.

In an embodiment of the novel process, the process for the preparation of the chromium dioxide which takes place in a reactor is carried out in such a way that the temperature is kept at about 130° C. for from one to two hours during the heating phase. In addition, it has been found to be particularly advantageous for the purposes of the present invention if heating of the reactor from 200° C. to 300° C. is carried out within a short period of, preferably, not more than 60 minutes.

In carrying out the novel process, an aqueous glycerol solution and octanol are added dropwise to a mixture of $CrO_3$ and water. An exothermic reaction takes place, in which the glycerol is completely oxidized and the octanol partly oxidized by $CrO_3$. In this way, the amount of unreacted octanol, or products of the partial oxidation, and hence the heat kick during the reaction in the reactor are minimized in a controlled manner, the condition for a free-flowing reaction mixture in a form which is easy to handle being fulfilled. For the aqueous $CrO_3$ suspension containing dissolved $CrO_3$, the number of parts by weight of $CrO_3$ used per part of water is such that, taking into account the amount of water formed in the oxidation of the glycerol and complete oxidation of the octanol and the amount of water in the glycerol solution, a total weight ratio of from 1.54 to 2.32 parts of $CrO_3$ to 1 part of water results. Dilution of the glycerol with water is necessary to achieve better control of the very vigorous reaction of glycerol and $CrO_3$. Glycerol is usually diluted with water in a weight ratio from 1:4.5 to 1:1.5 in the case of concentrated reaction mixtures. The amount of glycerol and octanol is such that from 33.0 to 50.0%, preferably 40%, of the total amount of $CrO_3$ is reduced from chromium(VI) to chromium(III).

Before the beginning of the dropwise addition of octanol and glycerol, the aqueous $CrO_3$ suspension is thoroughly stirred together with the dopants in a suitable apparatus and heated to 50°–70° C. The stirrer used is, for example, a dissolver. Iron and tellurium and/or antimony and/or compounds thereof are used as modifiers. The modifiers are employed in amounts of from 0.05 to 10.0% by weight, based on the amount of $CrO_3$, and are added to the aqueous $CrO_3$ suspension before the beginning of the addition of the organic reducing agents. The aqueous glycerol solution and octanol are then added dropwise to the mixture which is at 50°–70° C., with simultaneous cooling, so that the temperature of the mixture remains in the stated temperature range. To carry out the preparation of the reaction mixture in a simple and rapid manner and without accompanying foaming processes, the addition of the organic reducing agents is begun with glycerol. Complete reaction of the glycerol causes a continuous increase in the viscosity of the reaction mixture. The time of foam formation occurs earlier the smaller the amount of water used for the preparation of $CrO_2$. The foaming process is due to prevention of the expulsion of $CO_2$, the oxidation product of glycerol, at high viscosities.

In the novel embodiment of the process, 25% of the reduction equivalent is provided by glycerol in the case of a reduction of 40% of the amount of $CrO_3$ used and a weight ratio of 2.32 parts of $CrO_3$ per 1 part of water, taking into account the amount of water formed in a complete reaction. The amount of glycerol is increased continuously as the weight ratio changes in favor of water, and is 70% at a weight ratio of 1.54 parts of $CrO_3$ to 1 part of water. In all cases, the subsequent addition of octanol presents no problems since, owing to the then incomplete reaction with $CrO_3$, the viscosity increases only to a slight extent. At weight ratios of 1.98 parts of $CrO_3$ to 1 part of water and at higher ratios, octanol and glycerol can also be added simultaneously.

The free-flowing reaction mixture obtained by the novel procedure is introduced into steel reaction cans and converted into chromium dioxide in a high pressure reactor at at least 70 bar and from 250° to 400° C. During the heating phase of the reactor, the predetermined temperature is kept constant at 130° C. for from 1 to 2 hours in order, by the reduced supply of heat energy, completely to suppress the heat kick which still takes place to a small extent at this temperature. Furthermore, it is necessary to pass through the temperature range from 200° to 300° C. very rapidly, i.e. in a short period of, preferably, not more than one hour. In order to realise this required temperature profile also in the reaction mixture in a uniform manner, it may be advantageous to use annular reaction cans (according to U.S. Pat. No. 4,045,544) with layer thicknesses of less than 10 cm, preferably 5 cm. Thereafter, after the maximum temperature has been reached, cooling is carried out in a known manner in the course of not more than two hours, preferably immediately, to 220°–250° C. and the pressure is let down at the same time. The resulting chromium dioxide is removed mechanically from the reaction vessels and is milled. This is usually followed by a thermal treatment at from 150° to 400° C. under oxidizing conditions and stabilization by an alkaline and/or reductive surface treatment of the chromium dioxide.

Chromium dioxide prepared according to the invention has a coercive force of at least 60 kA/m and a specific saturation magnetization of more than 85 nTm$^3$/g, measured in a magnetic field of 380 kA/m. Another advantageous property is the very narrow range of the particle size distribution, whose mean deviation is less than 35% of the mean particle length, the latter being less than 300 nm.

This chromium dioxide material is therefore particularly advantageous for use in novel magnetic recording media which are intended for recording particularly high information densities. The novel chromium dioxide is processed to magnetic recording media by known methods. For the production of the magnetic layer, from 2 to 10 parts by weight of chromium dioxide, together with the binder and suitable dispersants, lubricants and further conventional additives in a total amount of up to 10% by weight of the chromium dioxide, are converted into a dispersion. The dispersion thus obtained is filtered and is applied using a conventional coating apparatus, for example by means of a knife coater, in one or more thin layers to the nonmagnetic substrate or in a thin layer to a magnetic recording medium already provided with another magnetic layer. Before the liquid coating mixture is dried at from 50° to 90° C., magnetic orientation of the chromium dioxide particles may be carried out. For a special surface treatment of the magnetic layer, the coated film webs are passed between heated, polished rollers under pressure. The thicknesses of the magnetic layers are then usually from 1.5 to 12 μm.

The binders used for the magnetic layers are the known polymer binders, such as acrylate copolymers, polyvinyl acetates, such as polyvinyl formal or polyvinyl butyral, relatively high molecular weight epoxy resins, polyurethanes and mixtures of these and similar binders. The elastomeric and virtually isocyanate-free linear polyesterurethanes which are soluble in a volatile organic solvent and can be prepared by reacting a polyester of an aliphatic dicarboxylic acid of 4 to 6 carbon atoms, such as 1,2- or 1,3-propylene glycol, 1,4-butanediol, diethylene glycol, neopentylglycol or 1,8-octanediol, with a diisocyanate of 6 to 24, in particular 8 to 20, carbon atoms, such as toluylene diisocyanate or 4,4'-diisocyanatodiphenylmethane, preferably in the presence of a relatively small amount of a glycol of 4 to 10 carbon atoms, such as 1,4-butanediol, which acts as a chain extender, have proven advantageous. Preferred polyesterurethanes are those obtained from adipic acid, 1,4-butanediol and 4,4'-diisocyanatodiphenylmethane. Preferred polyesterurethanes have a Shore hardness A of from 70 to 100, a tensile strength of from 40 to 42N/mm$^2$ (according to DIN 53,455) and an elongation at break (according to DIN 53,455) of about 440–560%. The K value according to H. Fikentscher (Cellulose-Chemie 13 (1932), page 58 et seq.) is from 40 to 60 (1% strength in dimethylformamide) for the particularly suitable polymer binders.

The Examples which follow illustrate the present invention in comparison with prior art examples.

For the resulting chromium dioxide, the specific surface area SSA in [m$^2$/g] according to DIN 66,132 was determined using a Ströhlein areameter from Ströhlein, Düsseldorf, by the one-point difference method according to Haul and Dümbgen, and the magnetic properties were determined by means of a vibrating sample magnetometer in a magnetic field of 380 kA/m, i.e. the coercive force $H_c$ in [kA/m] and a saturation magnetization $M_s/\zeta$ in [nTm$^3$/g]. The mean tap density $\zeta = 1.3$ g/cm$^3$.

The stated percentages of dopants in the Examples are based in each case on the amount of the resulting chromium dioxide.

The mean needle length of the chromium dioxide and the standard deviation are determined from the numerical distribution of the length of more than 200 particles in a transmission electron micrograph (at 50,000 times magnification). The results of the measurements are shown in the Table.

EXAMPLE 1

In a 20 l stirred vessel, 3.4 kg of water, 17.7 g of TeO$_2$ (=0.21% by weight) and 422 g of Fe$_2$O$_3$ (=5.0% by weight) are added to 10 kg of CrO$_3$ and dispersing is carried out for 30 minutes with the aid of a dissolver. During the dispersing procedure, first 226 g of 86.5% strength glycerol in 800 g of water are added to the reaction mixture at 50° C., followed by the addition of 242 g of 1-octanol at from 65° to 70° C.(ratio of reducing agents: 25% of glycerol/75% of octanol). After stirring has been carried out for a further 2 hours at 70° C., the reaction mixture is cooled to 30° C. and introduced in a 5 cm thick layer into 10 l annular-gap cans.

The filled reactor cans are heated to 345° C. at 360 bar in a high pressure reactor, the temperature being kept constant for 1.5 hours at 130° C. and the temperature range from 200° C. to 300° C. being passed through in the course of 1 hour.

Cooling from 345° to 325° C. is effected in 2.5 hours. Thereafter, the heating is switched off and the pressure is let down. After cooling to room temperature, the resulting CrO$_2$ is removed mechanically from the reaction cans, dried and milled. The results of the measurements are shown in the Table.

COMPARATIVE EXPERIMENT 1

The procedure is as described in Example 1, except that the CrO$_3$ is suspended in 4.3 kg of water, and 325 g of octanol are added as the reducing agent. The results of the measurements are shown in the Table.

EXAMPLE 2

In a 400 l reaction vessel, 128 l of water, 14.7 g of Fe$_2$O$_3$ (=5.0% by weight) and 529 g of TeO$_2$ (=0.18% by weight) are added to 350 kg of CrO$_3$, and dispersing is carried out for 20 minutes with the aid of two dissolvers. During this procedure, the suspension warms up to 55° C. First, 12.76 kg of 86.5% strength glycerol in 30.0 kg of water are added to this mixture in the course of 50 minutes while cooling, and then 68.4 kg of 1-octanol are then pumped into said mixture in the course of 80 minutes at a rate such that the temperature of the reaction mixture is from 60° to 70° C. The addition of the octanol is begun after glycerol has been added for 10 minutes and is carried out simultaneously with the addition of glycerol, so that a total addition time of 90 minutes results.

The reaction mixture obtained in the manner described is stirred for a further 30 minutes at 55° C. and then introduced into annular-gap cans in a layer thickness of 5 cm, heated to 360° C. at 360 bar in a high pressure reactor and cooled to 340° C. in the course of 3 hours. Thereafter, the mixture is cooled to room temperature in the course of 3 hours, and the pressure is let down after 15 minutes during cooling. The heating curve shows that this temperature is kept constant at 130° C. for 2 hours and the temperature range from 200° C. to 300° C. is passed through in the course of 1 hour.

The $CrO_2$ formed is mechanically removed from the reaction cans, milled, and dried. The results of the measurements are shown in the Table.

EXAMPLE 3

The procedure is as described in Example 2, except that the reaction mixture is introduced in a layer thickness of 10 cm into annular-gap cans. The results of the measurements are shown in the Table.

EXAMPLE 4

In a reaction vessel having a volume of 2 l 155.5 g of water are added to 500 g of $CrO_3$ and dispersing is carried out for 10 minutes with the aid of a dissolver. Thereafter, 21 g of $Fe_2O_3$ (=5.0% by weight, based on the theoretical yield of $CrO_2$) and 0.63 g of $TeO_2$ (0.15% by weight) are added to the suspension. 15.8 g of glycerol and 9.76 g of 1-octanol are added to the mixture at 60° C. while stirring is carried out for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

The results of the measurements are shown in the Table.

EXAMPLE 5

In a reaction vessel having a volume of 2 l, 153.4 g of water are added to 500 g of $CrO_3$ and dispersing is carried out for 10 minutes with the aid of a dissolver. Thereafter, 21 g of $Fe_2I_3$ (=5.0% by weight, based on the theoretical yield of $CrO_3$) and 0.67 g of $TeO_2$ are added to the suspension. 23.7 g of glycerol in 72 ml of water and 6.51 g of 1-octanol are added to the mixture at 60° C. while stirring is carried out for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

The results of the measurements are shown in the Table.

EXAMPLE 6

In a reaction vessel having a volume of 2 l, 153.4 g of water are added to 500 g of $CrO_3$ and dispersing is carried out for 10 minutes with the aid of a dissolver. Thereafter, 21 g of $Fe_2O_3$ (=5.0% by weight, based on the theoretical yield of $CrO_3$) and 0.88 g of $TeO_2$ are added to the suspension. 23.7 g of glycerol in 42 ml of water and 6.51 g of 1-octanol are added to the mixture at 60° C. while stirring is carried out for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

The results of the measurements are shown in the Table.

EXAMPLE 7

In a reaction vessel having a volume of 2 l, 153.4 g of water are added to 500 g of $CrO_3$ and dispersing is carried out for 10 minutes with the aid of a dissolver. Thereafter, 21 g of $Fe_2O_3$ (=5.0% by weight, based on the theoretical yield of $CrO_2$) and 0.76 g of $TeO_2$ are added to the suspension. 23.7 g of glycerol in 72 ml of water and 6.51 g of 1-octanol are added to the mixture at 60° C. while stirring is carried out for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

The results of the measurements are shown in the Table.

EXAMPLE 8

In a reaction vessel having a volume of 2 l, 154.5 g of water are added to 500 g of $CrO_3$ and dispersing is carried out for 10 minutes with the aid of a dissolver. Thereafter, 21 g of $Fe_2O_3$ (=5.0% by weight, based on the theoretical yield of $CrO_2$) and 0.55 g of $TeO_2$ are added to the suspension. 19.8 g of glycerol in 72 ml of water and 8.13 g of 1-octanol are added to the mixture at 60° C. while stirring is carried out for a further 20 minutes.

The reaction mixture obtained in the manner described is cooled and then heated in steel reaction vessels of 5 cm diameter in a high pressure reactor to 330° C. at 225 bar. The heating curve shows that the temperature range from 200° C. to 300° C. is passed through in the course of 1 hour. After 2 hours at 330° C., cooling is carried out immediately and the pressure is let down. After cooling to room temperature, the resulting $CrO_2$ is removed mechanically from the reaction cans, dried and milled.

The results of the measurements are shown in the Table.

COMPARATIVE EXPERIMENT 2

In a reaction vessel having a volume of 4 l, 463.5 g of water are added to 1,000 g of $CrO_3$ and dispersing is carried out for 10 minutes with the aid of a dissolver. Thereafter, 30.24 g of $Fe_2O_3$ and 1.26 g of $TeO_2$ are added to the suspension. 32.53 g of 1-octanol are added to the mixture at 70° C. while stirring for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

The results of the measurements are shown in the Table.

COMPARATIVE EXPERIMENT 3

In a reaction vessel having a volume of 2 l, 251.2 g of water are added to 500 g of $CrO_3$ and dispersing is carried out for 10 minutes with the aid of a dissolver. Thereafter, 21 g of $Fe_2O_3$ (=5.0% by weight, based on the theoretical yield of $CrO_2$) and 0.76 g of $TeO_2$ are added to the suspension. 16.3 g of 1-octanol are added to the mixture at 70° C. while stirring is carried out for a further 20 minutes.

The reaction mixture obtained in the manner described is cooled and then heated in steel reaction vessels of 5 cm diameter in a high pressure reactor to 350° C. at 320 bar. The heating curve shows that the temperature range from 200° C. to 300° C. is passed through in the course of 1 hour. After 2 hours at 350° C., cooling is carried out immediately and the pressure is let down. After cooling to room temperature, the resulting $CrO_2$ is removed mechanically from the reaction cans, dried and milled.

10% strength solution of a thermoplastic polyesterurethane obtained from adipic acid, 1,4-butanediol and 4,4'-diisocyanatodiphenylmethane in a mixture of equal amounts of tetrahydrofuran and dioxane, 48 parts of a 50% strength solution of a commercial polyvinyl formal in a mixture of equal amounts of tetrahydrofuran and dioxane, 144 parts of a solvent mixture consisting of equal amounts of tetrahydrofuran and dioxane and 2 parts of zinc stearate, and the mixture was dispersed for 4 hours. Thereafter, the same amounts of the two binder solutions, 13.5 parts of the stated solvent mixture and 0.1 part of a commercial silicone oil were added and dispersing was continued for a further 30 minutes. The dispersion was then filtered and was applied on a conventional coating apparatus by means of a knife coater to polyethylene terephthalate film in a thickness such that, after drying and calendering, a dry layer thickness of 5.5 μm resulted. Immediately after the liquid dispersion had been poured on, the acicular chromium dioxide particles were oriented by a magnetic field along the recording direction. The magnetic properties measured on the tape samples, the coercive force $H_c$ in [kA/m], the residual induction $M_r$ in [mT] and the orientation ratio OR, the ratio of the residual induction along the orientation direction and crosswise thereto, and the switching field distribution SFD according to Williams and Comstock (AIP Conf. Proc. 5 (1971), are shown in the Table.

Furthermore, the average peak-to-valley height $R_z$ of the magnetic layer was measured according to DIN 4768. By measuring the luminance signal at 4.5 MHz against the reference tape TDK HD-Pro at 0 dB, the recording properties were determined at a wavelength of 0.7 μm.

The corresponding measurements are shown in the Table.

EXAMPLES B2-B7 AND COMPARATIVE EXPERIMENTS BV1-BV3

The procedure was as in Example B1, except that the chromium dioxide materials obtained according to the Examples shown in the Table were used. The results of the measurements are shown in the Table.

TABLE

| | Examples | | | | | | | | Comparative Experiments | | |
|---|---|---|---|---|---|---|---|---|---|---|---|
| | 1 | 2 | 3 | 4 | 5 | 6 | 7 | 8 | 1 | 2 | 3 |
| Powder | | | | | | | | | | | |
| SSA | 32.3 | 30.9 | 31.0 | 32.2 | 32.7 | 34.5 | 31.5 | 30.4 | 29.3 | 32.7 | 32.7 |
| $H_c$ | 62.6 | 61.5 | 72.1 | 62.4 | 62.2 | 62.9 | 64.5 | 67.6 | 69.3 | 63.0 | 64.5 |
| $M_s/\kappa$ | 91.4 | 90.7 | 85.8 | 91.4 | 91.0 | 90.0 | 88.4 | 89.1 | 92.4 | 87.2 | 84.6 |
| L | 284 | 248 | 286 | 237 | 270 | 267 | 281 | 296 | 322 | 265 | 294 |
| ΔL | 73 | 83 | 85 | 67 | 81 | 66 | 97 | 82 | 102 | 103 | 108 |
| Magnetic tape | | | | | | | | | | | |
| $H_c$ | 62.8 | 62.2 | 76.7 | 62.2 | 61.2 | 64.9 | 65.1 | 70.2 | 73.6 | 61.1 | 64.8 |
| $M_r$ | 142 | 146 | 122 | 135 | 149 | 141 | 144 | 142 | 134 | 140 | 133 |
| OR | 3.5 | 3.0 | 2.7 | 2.8 | 3.0 | 3.0 | 3.2 | 2.8 | 3.6 | 2.6 | 3.2 |
| SFD | 0.22 | 0.23 | 0.26 | 0.25 | 0.24 | 0.27 | 0.24 | 0.23 | 0.24 | 0.23 | 0.25 |
| $R_z$ | 0.02 | 0.03 | 0.03 | 0.03 | 0.03 | 0.03 | 0.05 | 0.05 | 0.05 | 0.06 | 0.05 |
| Lu-S | +4.0 | +4.5 | +2.0 | +2.5 | +3.0 | +4.5 | +3.5 | +3.0 | +0.7 | +0.3 | −0.5 |
| HD factor | 2.44 | 1.86 | 2.58 | 2.20 | 2.04 | 2.63 | 1.89 | 2.53 | 2.32 | 1.57 | 1.76 |

EXAMPLE B1

In a mill having a capacity of 500 parts by volume and containing 200 parts by volume of steel balls having a diameter of 1.5 mm, 120 parts of the chromium dioxide obtained according to Example 1 and aftertreated with a sodium sulfite solution were mixed with 27 parts of a

We claim:

1. A process for the preparation of a chromium dioxide which is modified with iron and tellurium or antimony and has a coercive force greater than 60 kA/m, a saturation magnetization greater than 85 $nTm^3/g$ and a narrow particle size distribution in conjunction with a mean particle length of less than 300 nm, by reacting an aqueous $CrO_3$ suspension, to which from 0.05 to 10% by weight, based on chromium dioxide, of iron oxide and tellurium oxide or an antimony compound have been added, and organic reducing agents for establishing a Cr(VI):Cr(III) ratio of from 4:2 to 1:1, from 1.54 to 2.32 parts by weight of $CrO_3$ being used per part of water, taking into account the amount of water formed during the oxidation of the organic reducing agents, wherein the organic reducing agents used are glycerol and octanol, the amount of glycerol being from 25 to 70% based on the total reduction equivalent, whereafter the reaction mixture is heated to a temperature of from 250° to 400° C. under at least 70 bar.

* * * * *